Nov. 4, 1952     C. L. PETCH     2,616,587
KEEPER RING CONSTRUCTION
Filed May 14, 1949     2 SHEETS—SHEET 1
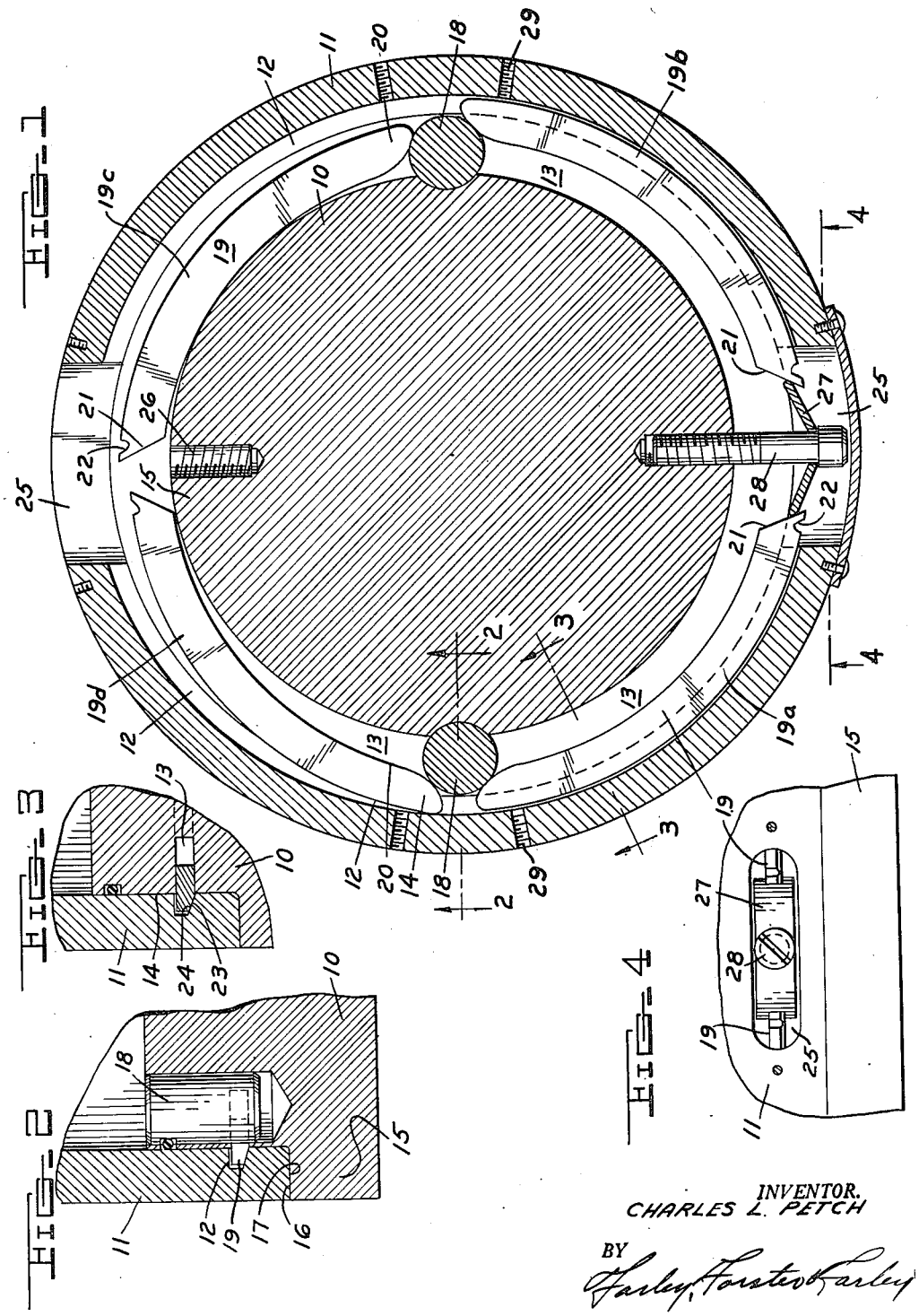
INVENTOR.
CHARLES L. PETCH
BY
ATTORNEYS

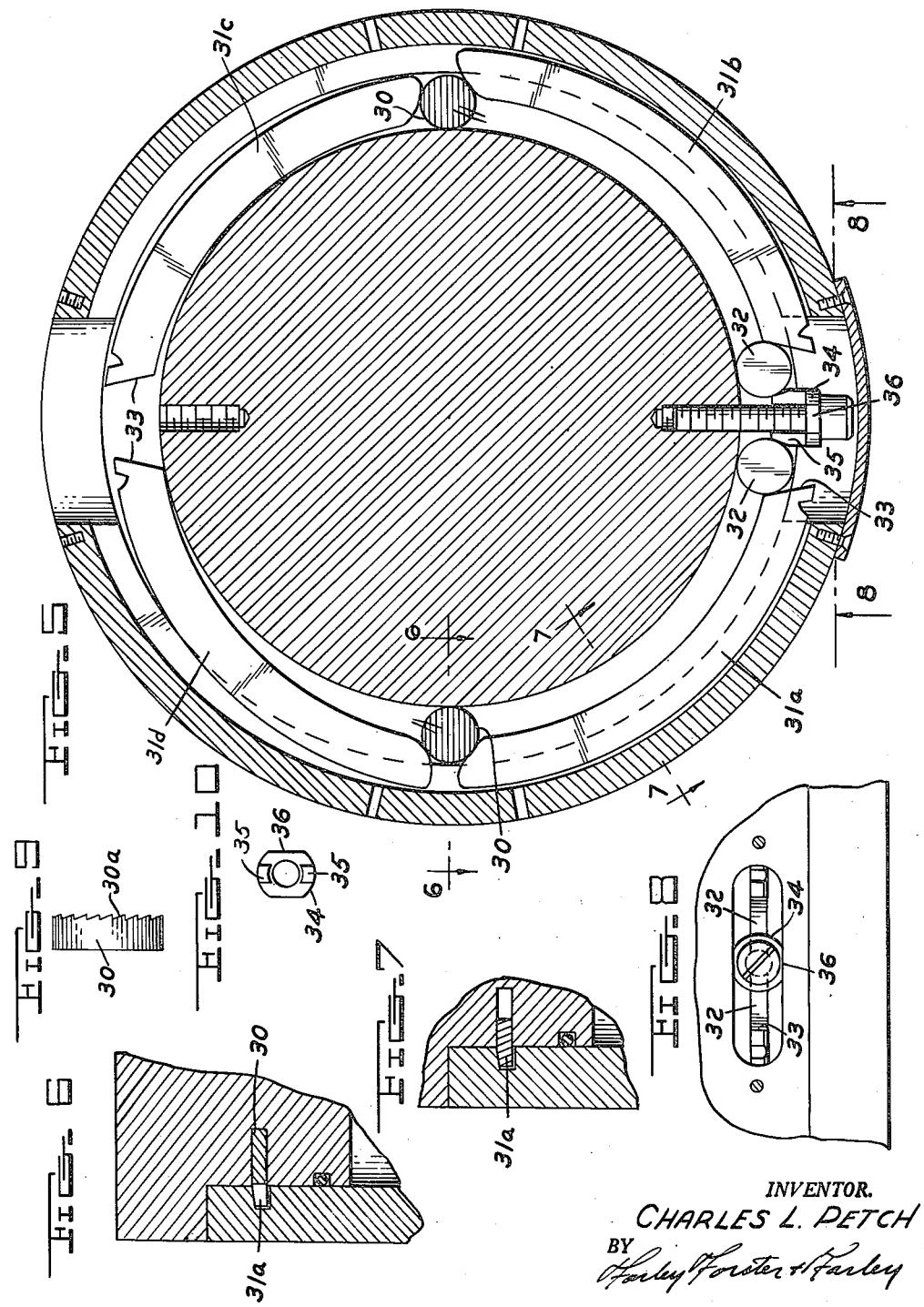

Patented Nov. 4, 1952

2,616,587

UNITED STATES PATENT OFFICE 2,616,587

KEEPER RING CONSTRUCTION

Charles L. Petch, Grosse Pointe, Mich.

Application May 14, 1949, Serial No. 93,249

5 Claims. (Cl. 220—61)

This invention relates to a keeper ring construction for assembling a fluid pressure cylinder and cylinder head.

In pending application, Serial No. 71,462, a snap ring construction is shown wherein abutting surfaces of a cylinder and cylinder head are positively engaged through the action of a tapered snap ring seated in opposing internal grooves of the cylinder and cylinder head. In assembling such cylinder and cylinder head, the snap ring was compressed into an external groove of the cylinder head which was then inserted within the cylinder. The snap ring was stressed to expand upon reaching the opposed internal groove in the cylinder, and tapered surfaces in the snap ring and cylinder groove forced a flanged portion of the cylinder head to abutting engagement with the end of the cylinder.

The disassembly of the cylinder head in said aforementioned construction was affected by engagement with a plier-like tool of notched ends of the snap ring through a slotted opening in the wall of the cylinder which permitted the snap ring to be compressed for withdrawal of the cylinder head.

While such construction proved to be entirely satisfactory for small cylinders and light-pressure applications, it was found that large diameter and high pressure requirements involved the use of a snap ring of such high strength as to be incapable of convenient compresison through the use of a hand tool. Furthermore, with such snap ring construction, a certain degree of care was required in the assembly operation to make such that the ring was properly seated throughout its circumference. For example, it was found necessary on some occasions to tap the cylinder head with a hammer in order to jar the respective parts and permit the spring action of the snap ring to move it into its fully seated position.

The present keeper ring construction was developed primarily to overcome these problems. More specifically, it is an object of the present invention to provide a keeper ring construction having the advantages of a tapered snap ring but which may be readily assembled and disassembled without the necessity of applying excessive collapsing forces.

Another object is to provide a construction wherein full seating of ring members can be effected by a positive means.

Another object is to provide a sectional keeper ring construction wherein none of the individual segments need be sprung during assembly or disassembly operations.

Another object is to provide cam members for forcing the ends of individual segments of the keeper ring into firm locking engagement.

Another object is to provide spreader-members actuated by screws to positively force segments of the keeper ring into locking position.

These and other objects will be more apparent from the following detailed description of a particular embodiment of my invention and from an examination of the drawings forming a part hereof wherein Fig. 1 is a cross-sectional view of cylinder and cylinder head showing grooves and keeper ring segments;

Fig. 2 is a fragmentary sectional view taken along the line 2—2 of Fig. 1;

Fig. 3 is a fragmentary sectional view taken along the line 3—3 of Fig. 1;

Fig. 4 is a fragmentary view taken along the line 4—4 of Fig. 1;

Fig. 5 is a view similar to Fig. 1 of a modified construction;

Fig. 6 is a fragmentary sectional view taken along the line 6—6 of Fig. 5;

Fig. 7 is a fragmentary sectional view taken along the line 7—7 Fig. 5;

Fig. 8 is a fragmentary sectional view taken along the line 8—8 of Fig. 5;

Fig. 9 is an end view of the serrated roll spreader shown in Figs. 5 and 6; and

Fig. 10 is an end view of the roll wedge employed in spreading the ring segments.

Referring to Figs. 1–4, it will be seen that a cylinder head 10 fits closely within a cylinder 11 and that mating grooves 12 and 13 are provided respectively in the cylinder and cylinder head on either side of the parting line 14. The cylinder head 10 is provided with a flange 15 having an annular surface 16 adapted to come into abutting engagement with the end 17 of the cylinder 11 when the grooves 12 and 13 are in substantial alignment.

A pair of dowel pins 18 are seated in the cylinder head close to the edge thereof and project through the groove 13 in the cylinder head 10. The keeper ring in the present construction includes four identical segments 19, one end 20, which is curved to ride on the surface of the dowel pin 18, and the other end of which is provided with a tapered surface 21.

As best shown in Fig. 3, the ring segments are generally rectangular in cross-section and are provided with a tapered surface 23 to mate with the tapered surface 24 in the cylinder groove 12. The groove 13 is dimensioned for a sliding fit with the ring segment 19 and the groove 12 is dimensioned to permit the tapered surfaces 23 and 24 to force the abutting surfaces 16, 17 in the cylinder head and cylinder into preloaded engagement when the ring segments 19 are forced outwardly into the groove 12, the nominal dimensions of the groove 12 being such as to provide a very slight clearance between the straight side of said groove and the corresponding side of the ring segment when the latter is firmly seated under pressure. Such dimensioning is employed in order to minimize the rolling action that can take place in the ring segments when heavy pressure is applied to the cylinder head placing the ring segments under shear stresses, while nevertheless permitting the tapered surfaces 23 and 24 to preload the abutting surfaces 16 and 17.

The preferred method of assembling the cylinder and cylinder head involes the following procedure:

The cylinder head 10 is placed with its outer end downward on a horizontal surface and the ring segments 19 are each inserted to the position shown by segment 19c. The cylinder 11 is then moved into place with the slotted openings 25 in alignment with the threaded holes 26 in the cylinder head as shown in Fig. 1. The segments 19 are then moved, for example, by a screw driver engaging notches 22, into the position shown by segment 19d, wherein the end 20 rides on the surface of the dowel pin 18 and is wedged into the cylinder groove 12. The ends 21 of the segments 19 are then lifted outwardly to a snug position in the cylinder grooves 12 without permitting the ends 20 to ride back off the pins 18.

A spreader element 27 and bolt 28 are next inserted between adjacent ends 21 of segments 19 whereupon the bolt 28 is turned down. The spreader element 27 spans the groove 13 in the cylinder head and contacts the tapered ends 21 of the ring segments 19, the straightening pressure applied by the bolt 28 forcing the ends of the spreader element 27 laterally against such tapered surfaces and forcing such ends outwardly into the cylinder groove 12. It will be seen that the outward movement of the ends 21 will cause the inner ends 20 to roll to a higher point on the pins 18 thereby causing inner as well as outer ends of the segments to become firmly seated in the cylinder groove 12.

The ring segments 19 are formed as concentric elements of a true circle when in their final seated position, but are nevertheless capable of being entirely contained within the cylinder head groove 13, as shown by segment 19c, for assembly and disassembly purposes.

In order to disassemble the cylinder head, the spreader elements 27 are withdrawn and the segments loosened by inserting a suitable tool in the notches 22, and tapping the ends of the segments down into the groove 13 thereby loosening the segments and permitting them to be moved to the position shown by segment 19c. When each of the four segments is in such position, the cylinder 11 may be readily removed.

Small access holes 29 are provided to aid in loosening the inner ends 20 of the ring segments in the event they cannot be loosened from the access slots 25.

With reference to Figs. 5–10 showing a modified construction of cam and spreader elements, it will be seen that in place of the dowel pins 18, relatively thin serrated roll spreaders 30 are employed which are driven into the groove in the cylinder head, thereby eliminating the necessity of providing dowel pin holes in the cylinder head as well as the chance of leakage through such holes which by-pass the O ring seal. The serrations 30a on one side of the roll spreaders 30 are directed along a radial line when the spreaders 30 are driven into position, operating to firmly seat such members against dislocation from any unbalanced lateral pressure exerted by the ends of keeper ring segments 31a–d. The cam action of these roll spreaders 30 will be seen to be identical with that of dowel pins 18.

In place of the spreader element 27, the modified construction employs a pair of roll spreaders 32 fitting loosely in the cylinder head groove. These roll spreaders are adapted to exert lateral and upward pressure on the tapered ends 33 of the ring segments 31a–d in response to the lateral pressure exerted by a roll wedge 34 when screwed down. The wedge 34 has a pair of tapered projections 35 which engage the perifery of the roll spreaders 32 and a pair of flats 36 which engage the sides of the access slot in the cylinder to prevent the wedge from turning when screwed down.

This modified construction permits the spreading elements to be engaged and removed repeatedly without any permanent distortion and is therefore preferred over the spreader element 27 of the first embodiment.

Thus it is seen that a keeper ring construction has been provided which meets each of the objects set forth above. While two particular embodiments of my invention have been described herein in detail, it will be understood that various modifications might be resorted to without departing from the scope of my invention as defined in the following claims.

I claim:

1. In a fluid pressure cylinder assembly, a cylinder and cylinder head having abutting and overlapping concentric surfaces, opposed grooves in said overlapping surfaces, a plurality of rigid ring segments constructed to extend into each of said grooves to retain said cylinder and cylinder head in an assembled relation, one of said grooves and each of said segments being provided with cooperating tapered surfaces adapted to wedge said abutting surfaces into firm engagement in response to outward movement of said segments, a fixed fulcrum element engaged by one end of each of said segments and a movable spreader element for engaging the other end of each of said segments, said fulcrum and spreader elements being adapted to force said rigid segments outwardly into wedging engagement with the tapered groove, said ring segments and tapered groove being dimensioned to provide substantial clearance therebetween apart from said engaging tapered surfaces to assure wedging action sufficient to produce said abutting engagement notwithstanding commercial manufacturing tolerances in the dimensions of the respective parts.

2. In a fluid pressure cylinder assembly, a cylinder and cylinder head having abutting and overlapping concentric surfaces, opposed grooves in said overlapping surfaces, four rigid ring segments constructed to extend into each of said grooves to retain said cylinder and cylinder head in an assembled relation, a fixed fulcrum element engagable by one end of each of said segments, a pair of spreader elements constructed to engage the other end of each of said segments, one of said grooves and each of said segments being provided with cooperating tapered surfaces constructed to wedge said abutting surfaces into firm engagement in response to the outward movement of said segments, and externally accessible spreader actuating means for moving said ring segments into wedging assembled position, said ring segments and tapered groove being dimensioned to provide substantial clearance therebetween apart from said engaging tapered surfaces to assure wedging action sufficient to produce said abutting engagement notwithstanding commercial manufacturing tolerances in the dimensions of the respective parts.

3. In a fluid pressure cylinder assembly, a cylinder and cylinder head having abutting and overlapping concentric surfaces, opposed grooves in said overlapping surfaces, a plurality of rigid ring segments constructed to extend into each of said grooves when moved to their outermost positions to retain said cylinder and cylinder head in assembled relation, one of said grooves and each of said segments being provided with cooperating tapered surfaces adapted to wedge said abutting surfaces into firm engagement in response to the outward movement of said segments, a plurality of fixed cylindrical pins projecting through the innermost of said grooves engageable by one end of each of said segments, a plurality of spreader elements constructed to engage the other end of each of said segments, and externally accessible spreader actuating means for moving said ring segments into wedging assembled position, said ring segments and tapered groove being dimensioned to provide substantial clearance therebetween apart from said engaging tapered surfaces to assure wedging action sufficient to produce said abutting engagement notwithstanding commercial manufacturing tolerances in the dimensions of the respective parts.

4. In a fluid pressure cylinder assembly, a cylinder and cylinder head having abutting and overlapping concentric surfaces, opposed grooves in said overlapping surfaces, a plurality of rigid ring segments constructed to extend into each of said grooves when moved to their outermost positions to retain said cylinder and cylinder head in assembled relation, one of said grooves and each of said segments being provided with cooperating tapered surfaces adapted to wedge said abutting surfaces into firm engagement in response to the outward movement of said segments, a plurality of fixed cylindrical rolls seated in the innermost of said grooves engageable by one end of each of said segments, a plurality of movable spreader elements constructed to engage the other end of each of said segments, and externally accessible spreader actuating means for moving said ring segments into wedging assembled position, said ring segments and tapered groove being dimensioned to provide substantial clearance therebetween apart from said engaging tapered surfaces to assure wedging action sufficient to produce said abutting engagement notwithstanding commercial manufacturing tolerances in the dimensions of the respective parts.

5. In a fluid pressure cylinder assembly, a cylinder and cylinder head having abutting and overlapping concentric surfaces, opposed grooves in said overlapping surfaces, four rigid ring segments constructed to extend into each of said grooves when moved to their outermost positions, cooperating tapered surfaces in one of said grooves and each of said segments adapted to wedge said abutting surfaces into firm engagement in response to the outward movement of said segments, a pair of cylindrical rolls seated in the innermost groove each engagable by adjacent ends of two of said segments, spreader rolls for engaging the other adjacent ends of said segments, and externally accessible screw actuated means for moving said spreader rolls and ring segments into wedging assembled position, said ring segments and tapered groove being dimensioned to provide substantial clearance therebetween apart from said engaging tapered surfaces to assure wedging action sufficient to produce said abutting engagement notwithstanding commercial manufacturing tolerances in the dimensions of the respective parts.

CHARLES L. PETCH.

REFERENCES CITED

The following references are of record in the file of this patent:

UNITED STATES PATENTS

| Number | Name | Date |
| --- | --- | --- |
| 1,734,236 | Smith et al. | Nov. 5, 1929 |
| 1,767,217 | Kraft | June 24, 1930 |
| 1,874,833 | Taylor | Aug. 30, 1932 |
| 2,196,895 | Bowman | Apr. 9, 1940 |
| 2,298,511 | Rathbun | Oct. 13, 1942 |
| 2,390,445 | Mercier | Dec. 4, 1945 |
| 2,399,327 | Cullen | Apr. 30, 1946 |
| 2,436,407 | Stephens | Feb. 24, 1948 |

FOREIGN PATENTS

| Number | Country | Date |
| --- | --- | --- |
| 263,723 | Great Britain | Jan. 6, 1927 |
| 437,138 | Germany | Nov. 15, 1926 |
| 490,788 | Germany | Feb. 10, 1930 |
| 498,789 | Germany | May 27, 1930 |
| 597,385 | Germany | May 25, 1934 |